(12) United States Patent  
Pax

(10) Patent No.: US 8,512,024 B2
(45) Date of Patent: Aug. 20, 2013

(54) MULTI-EXTRUDER

(75) Inventor: Charles E. Pax, Maplewood, NJ (US)

(73) Assignee: MakerBot Industries, LLC, Brooklyn, NY (US)

(*) Notice: Subject to any disclaimer, the term of this patent is extended or adjusted under 35 U.S.C. 154(b) by 458 days.

(21) Appl. No.: 13/010,260

(22) Filed: Jan. 20, 2011

(65) Prior Publication Data

US 2012/0189729 A1    Jul. 26, 2012

(51) Int. Cl.
*B29C 47/12* (2006.01)
*B28B 1/14* (2006.01)

(52) U.S. Cl.
USPC ..... 425/131.1; 226/181; 226/188; 425/131.5; 425/192 R; 425/376.1

(58) Field of Classification Search
USPC ............. 425/130, 131.1, 131.5, 132, 144, 425/182, 192 R, 375, 376.1, 378.1, 174.4; 242/419.5, 419.8; 226/181, 182, 188, 189, 226/190, 194; 264/40.7, 113, 308, 401
See application file for complete search history.

(56) References Cited

U.S. PATENT DOCUMENTS

| | | | |
|---|---|---|---|
| 3,148,059 A | 9/1964 | Bronson et al. | |
| 3,294,532 A | 12/1966 | Bronson et al. | |
| 3,498,772 A * | 3/1970 | Stalego | 65/526 |
| 5,121,329 A | 6/1992 | Crump | |
| 5,204,055 A | 4/1993 | Sachs et al. | |
| 5,340,433 A * | 8/1994 | Crump | 156/578 |
| 5,503,785 A | 4/1996 | Crump et al. | |
| 5,633,021 A * | 5/1997 | Brown et al. | 425/375 |
| 5,653,925 A | 8/1997 | Batchelder | |
| 5,764,521 A | 6/1998 | Batchelder et al. | |
| 5,866,058 A | 2/1999 | Batchelder et al. | |
| 5,980,813 A | 11/1999 | Narang et al. | |
| 6,004,124 A | 12/1999 | Swanson et al. | |
| 6,022,207 A * | 2/2000 | Dahlin et al. | 425/145 |
| 6,041,991 A * | 3/2000 | Mehri et al. | 226/177 |
| 6,054,077 A | 4/2000 | Comb et al. | |
| 6,067,480 A | 5/2000 | Stuffle et al. | |
| 6,085,957 A * | 7/2000 | Zinniel et al. | 226/8 |
| 6,165,406 A | 12/2000 | Jang et al. | |
| 6,180,049 B1 | 1/2001 | Jang et al. | |
| 6,214,279 B1 | 4/2001 | Yang et al. | |
| 6,238,614 B1 | 5/2001 | Yang et al. | |
| 6,280,785 B1 * | 8/2001 | Yang et al. | 426/231 |
| 6,305,769 B1 | 10/2001 | Thayer et al. | |
| 6,401,001 B1 | 6/2002 | Jang et al. | |
| 6,405,095 B1 | 6/2002 | Jang et al. | |
| 6,508,971 B2 | 1/2003 | Leyden et al. | |
| 6,547,995 B1 | 4/2003 | Comb | |
| 6,578,596 B1 | 6/2003 | Batchelder et al. | |
| 6,749,414 B1 | 6/2004 | Hanson et al. | |
| 6,782,303 B1 | 8/2004 | Fong | |
| 6,989,115 B2 | 1/2006 | Russell et al. | |
| 6,998,087 B1 | 2/2006 | Hanson et al. | |
| 7,172,715 B2 | 2/2007 | Swanson et al. | |
| 7,236,166 B2 | 6/2007 | Zinniel et al. | |
| 7,368,484 B2 | 5/2008 | Levy | |
| 7,369,915 B2 | 5/2008 | Kritchman et al. | |
| 7,384,255 B2 * | 6/2008 | LaBossiere et al. | 425/190 |

(Continued)

*Primary Examiner* — Yogendra Gupta
*Assistant Examiner* — Emmanuel S Luk
(74) *Attorney, Agent, or Firm* — Strategic Patents, P.C.

(57) ABSTRACT

Multiple extrusion drive motors are nested in an overlapping configuration that permits re-use of the drive axes to support drive gears and complementary guide bearings, resulting in a compact arrangement of independently controllable extruders for multiple build materials.

20 Claims, 4 Drawing Sheets

(56) References Cited

U.S. PATENT DOCUMENTS

| | | |
|---|---|---|
| 7,500,846 B2 | 3/2009 | Eshed et al. |
| 7,502,023 B2 | 3/2009 | Zinniel et al. |
| 7,513,596 B2 | 4/2009 | Silverbrook |
| 7,572,403 B2 | 8/2009 | Gu et al. |
| 7,604,470 B2 * | 10/2009 | LaBossiere et al. ....... 425/131.1 |
| 7,625,200 B2 | 12/2009 | Leavitt |
| 7,744,364 B2 | 6/2010 | Turley et al. |
| 7,891,964 B2 * | 2/2011 | Skubic et al. ................. 425/375 |
| 7,896,209 B2 * | 3/2011 | Batchelder et al. ............. 226/53 |
| 8,033,811 B2 * | 10/2011 | Swanson et al. ............. 425/375 |
| 8,221,669 B2 * | 7/2012 | Batchelder et al. ........... 264/308 |
| 2001/0030383 A1 * | 10/2001 | Swanson et al. ............. 264/308 |
| 2001/0038025 A1 * | 11/2001 | Brenk .......................... 226/187 |
| 2002/0062909 A1 | 5/2002 | Jang et al. |
| 2002/0079601 A1 | 6/2002 | Russell et al. |
| 2004/0126452 A1 * | 7/2004 | Swanson et al. ................ 425/73 |
| 2005/0004282 A1 | 1/2005 | Priedeman et al. |
| 2007/0090568 A1 * | 4/2007 | Teal et al. .................... 264/308 |
| 2007/0228590 A1 | 10/2007 | LaBossiere et al. |
| 2008/0042321 A1 | 2/2008 | Russell et al. |
| 2009/0035405 A1 * | 2/2009 | Leavitt ............................ 425/97 |
| 2009/0273122 A1 | 11/2009 | Batchelder et al. |
| 2009/0314391 A1 | 12/2009 | Crump et al. |
| 2010/0096072 A1 | 4/2010 | Hopkins et al. |
| 2010/0283172 A1 * | 11/2010 | Swanson ......................... 264/80 |
| 2012/0164256 A1 * | 6/2012 | Swanson et al. ............. 425/162 |

* cited by examiner

MULTI-EXTRUDER

BACKGROUND

The invention relates to a three-dimensional fabrication device that extrudes multiple build materials.

SUMMARY

Multiple extrusion drive motors are nested in an overlapping configuration that permits re-use of the drive axes to support drive gears and complementary guide bearings, resulting in a compact arrangement of independently controllable extruders for multiple build materials.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

DETAILED DESCRIPTION

Described herein are devices where drive motors are nested with overlapping axes to permit compact configurations of multiple, independently controlled extruders. It will be understood that while the exemplary embodiments below emphasize fabrication techniques using extrusion, the principles of the invention may be adapted to a wide variety of applications where two or more offset axes can provide complementary drive gears and guide bearings. All such variations that can be adapted to use with fabrication process as described herein are intended to fall within the scope of this disclosure. It should also be understood that any reference herein to a fabrication process such as three-dimensional printing is intended to refer to any and all additive fabrication techniques that might benefit from the principles disclosed herein unless a narrower meaning is explicitly stated or otherwise clear from the context.

Figure 1:
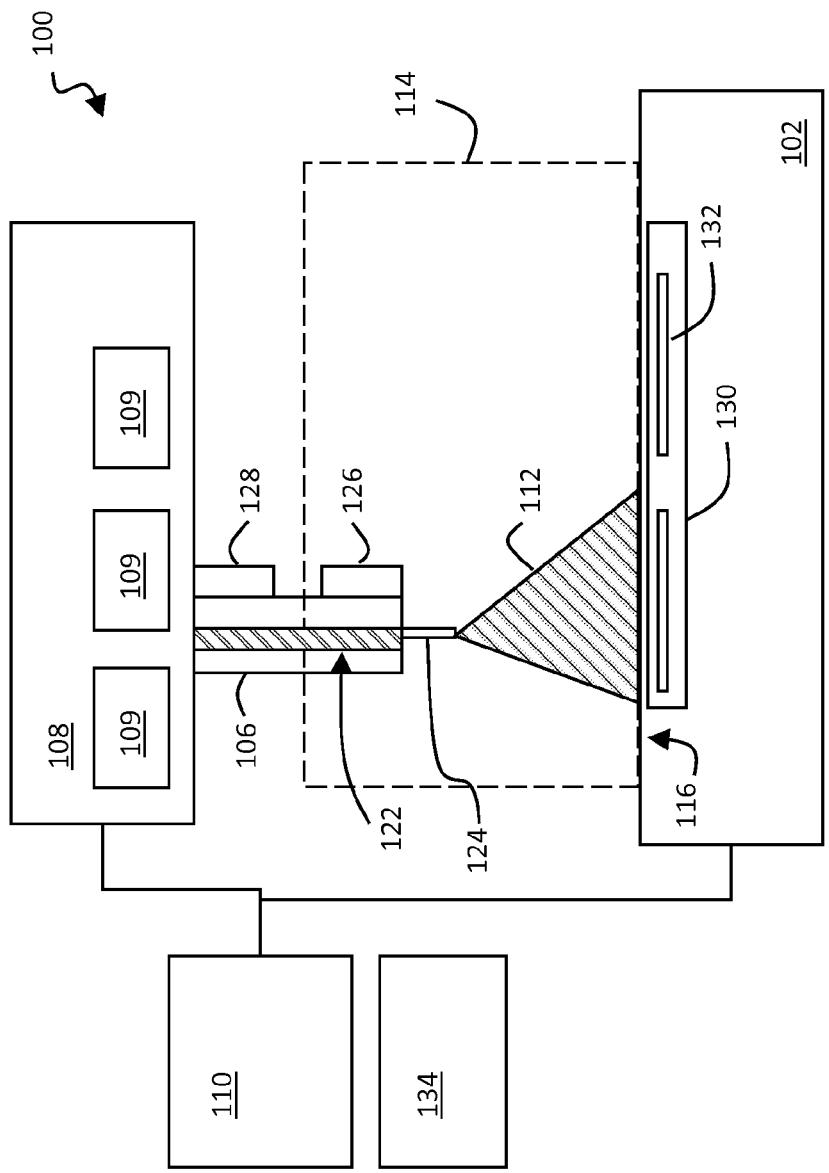
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar, or more generally, and surface that can provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric or other heating and/or cooling devices. Thus, the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102.

In one aspect, the build platform 102 may include a number of different working areas with different surface treatments adapted for different build materials or processes, and/or a conveyer for continuous fabrication of multiple objects. For example, different areas may have different textures (smooth, abraded, grooved, etc.). Different areas may be formed of different materials. Different areas may also have or receive different chemical treatments. Thus, a single build platform 102 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include a nozzle 124 or other opening that includes an exit port with a circular, oval, slotted, or other cross-sectional profile that extrudes build material in a desired cross-sectional shape, typically in a plane parallel to the surface 116 of the build platform 102.

The extruder 106 may include a heater 126 to melt thermoplastic or other meltable build materials within the chamber 122 for extrusion through the nozzle 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 126.

As explained in greater detail below, the extruder 106 may be a multi-extruder configured to handle and/or extrude multiple build materials as discussed in greater detail below. Thus, it will be understood that while a single heater 126, chamber 122, nozzle 124, and so forth are depicted, the extruder 106 may include two or more of some or all of the foregoing to accommodate multi-extrusion. So for example, the device may include a pair of nozzles such as the nozzle 124, a pair of heating elements such as the heater 126, and/or a pair of interior chambers to receive build material, each of which may process build material from one of the two independently controllable filament drives.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis.

More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 11 may be suitably adapted to use with the printer 100 described herein. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to spherical coordinates.

The controller 110 may be electrically coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, such as a thermistor or the like embedded within or attached below the surface of the build platform 102. This may also or instead include an infrared detector or the like directed at the surface 116 of the build platform or any other suitable temperature sensing arrangement.

In another aspect, the other hardware 134 may include a sensor to detect a presence of the object 112 at a predetermined location within the working volume 114. This may include an optical detector arranged in a beam-breaking configuration to sense the presence of the object 112 at a location. This may also or instead include an imaging device and image processing circuitry to capture an image of the working volume and analyze the image to evaluate a position of the object. This sensor may be used for example to ensure that the object 112 is removed from the working volume 114 prior to beginning a new build at that location on the working surface. Thus the sensor may be used to determine whether an object is present that should not be, or to detect when an object is absent. The feedback from this sensor may be used by the controller 110 to issue processing interrupts or otherwise control operation of the printer 100.

In another aspect, the sensor may include a heater (instead of or in addition to the thermal element 130) to heat the working volume such as a radiant heater or forced hot air to maintain the object 112 at a fixed, elevated temperature throughout a build. It will be appreciated that, while a single extruder is shown and described in FIG. 1, any number of extruders (along with accompanying hardware) may be included in the printer 100, such as two or more extruders arranged as described below.

Figure 2:
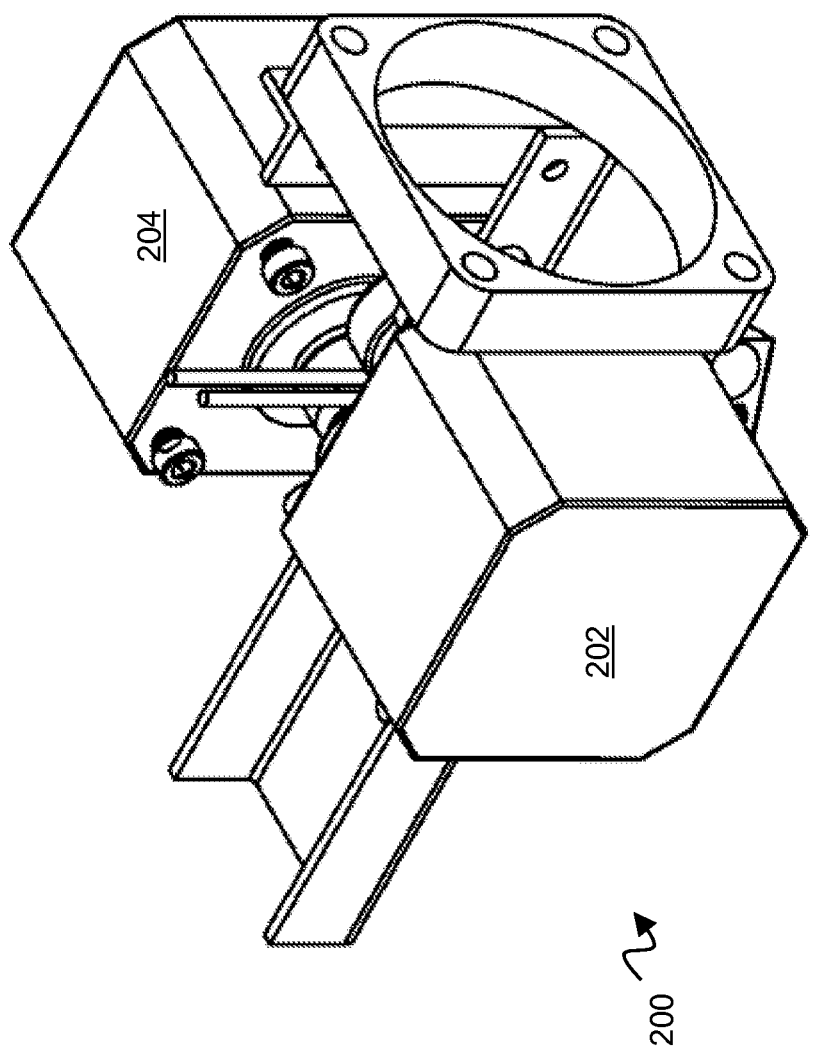
FIG. 2 is a perspective view of drive motors for a multi-extruder.

FIG. 2 is a perspective view of drive motors for a multi-extruder. In general, a multi-extruder 200 includes a first drive motor 202 and a second drive motor 204 each having an axis with a fixed gear and a free-wheeling bearing. The pair of drive motors 202, 204 may be arranged in an opposing, overlapping arrangement so that the fixed gear of one drive motor aligns with the free-wheeling bearing of the other drive motor to form two independently controllable filament drives. In this manner, two or more filaments or other sources of build material may be independently driven in an extrusion process such as that described above. As a significant advantage, this arrangement of drive motors can be employed to provide a compact multi-extrusion device with very close spacing between independently controlled filaments. Where desired, this arrangement can also support reuse of other hardware (e.g., a nozzle, heater, and so forth) for non-concurrent extrusions of multiple build materials.

Figure 3:
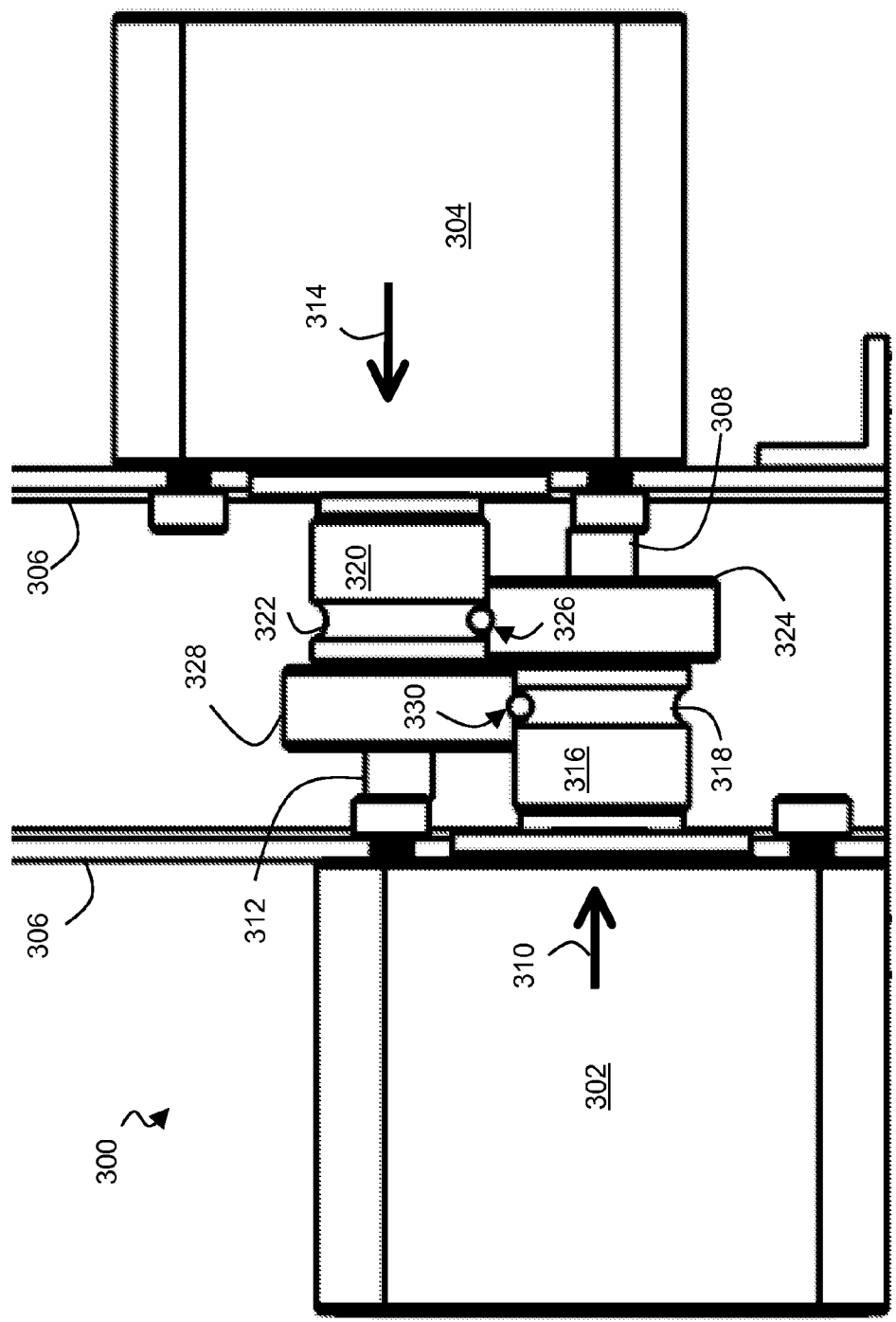
FIG. 3 is a top view of drive motors for a multi-extruder.

FIG. 3 is a top view of drive motors for a multi-extruder. It will be appreciated that the term multi-extruder as used herein is intended to refer to an entire, integrated multi-material extrusion system, as well as sub-assemblies thereof that are used in a multi-material extrusion process. Thus, for example, only certain components of the multi-extruder are illustrated in FIG. 3, with an emphasis on the arrangement of motors, gears, and bearings that result in the compact, efficient design of the invention. Nonetheless, additional or different components of a multi-extruder may be used without departing from the scope of this invention.

The multi-extruder 300 may include a first motor 302 and a second motor 304 secured to two opposing plates 306. Each motor 302, 304 may be a DC stepper motor or any other drive unit suitable for applying adequate force to a filament for extrusion as contemplated herein.

The first motor 302 may have a first axis 308 extending therefrom in a first direction 310. An end of the first axis 308 away from the first motor 302 may be secured, for example, in a bearing secured in the opposing plate 306 from the one that retains the first motor 302. The second motor 304 may similarly include a second axis 312 extending in a second therefrom in a second direction 314, with an end of the second axis 312 secured in the one of the opposing plates 306 that secures the first motor 302.

The second axis 312 of the second motor 304 may be parallel to the first axis 308 of the first motor 302, with the two axes 308, 312 pointing in opposite directions as depicted, and overlapping one another to provide a space therebetween where gears and bearings can be arranged as discussed below.

A first gear 316 may be rigidly coupled to the first axis 308 in a manner such that rotation of the first motor 302 directly translates into rotation of the first axis 308 and the first gear 316. The first gear 316 may include a concave, toothed portion 318 around its perimeter that includes teeth, ribs, or other similar surface treatment capable of gripping a filament of build material under opposing pressure from a bearing. A second gear 320 may be rigidly coupled to the second axis 312 in a manner such that rotation of the second motor 304 directly translates into rotation of the second axis 312 and the second gear 320. The second gear 320 may include a concave, toothed portion 322 around its perimeter that includes teeth, ribs, or other similar surface treatment capable of gripping a filament of build material under opposing pressure from a bearing or the like.

A first bearing 324 may be rotatably coupled to the first axis 308 in a free-wheeling manner at a position axially aligned with (e.g., positioned along the axis at a corresponding position to) the second gear 320 so that a first channel 326 is formed between the first bearing 324 and the second gear 320. Within the first channel 326, the concave, toothed portion 322 of the second gear 320 can grip and propel a filament under power of the second motor 304, with opposing pressure providing by the first bearing 324. Similarly, a second bearing 328 may be rotatably coupled to the second axis 312 in a free-wheeling manner at a position axially aligned with (e.g., positioned along the axis at a corresponding position to) the first gear 316 so that a second channel 330 is formed between the second bearing 328 and the first gear 316. Within the second channel 330, the concave, toothed portion 318 of the first gear 316 can grip and propel a filament under power of the first motor 302, with opposing pressure provided by the second bearing 328.

The first gear 316 and the second gear 320 may be equally proportioned, particularly with respect to radius and the shape/size/depth of the concave, toothed portions 322, 318. This may be particularly useful where filaments of similar or identical diameter are used in each channel 326, 330. Conversely, each of the gears 316, 320 may be differently proportioned, with corresponding adaptations to the shape and size of the opposing bearings 324, 328 and other components. The first motor 302 and/or the second motor 304 may also be equally proportioned, and/or may provide equivalent drive forces. Similarly, the first bearing 324 and the second bearing 328 may be equally proportioned, or may have differing sizes and/or shapes.

In one aspect, the first channel 326 may be offset (within the plane of FIG. 3, or within the plane of a build platform or the like onto which the multi-extruder deposits material) from the second channel 330 by an amount substantially equal to an x and/or y resolution of an x-y-z positioning system, so that each channel can extrude onto the substantially the same location in an object to the extent that the x-y position can be resolved by a printer. In another aspect, the first channel 326 and the second channel 330 may be offset from one another by a fractional amount of the x-y resolution in order to facilitate sub-pixel resolution in a printing process.

The first motor 302 and the second motor 304 may be coupled to a controller such as the controller 110 described above in order to control operation of the two motors 302, 304, which may operate cooperatively or independently according to the desired output from the multi-extruder 300. As noted generally above, the controller 110 may control a build process using two filaments fed to the multi-extruder 300. It will be readily appreciated that any number of other additional motors and/or gears may be arranged to drive one or more additional build materials in an extrusion process as contemplated herein. So for example, three filament feeds may be closely arranged with three axes, each carrying a fixed gear, along with free-wheeling bearings arranged to provide complementary forces for gripping and driving filament. It will similarly be appreciated that two or more of the independently controllable filament drives may share components such as a nozzle, a heating element, an interior chamber, and so forth.

Figure 4:
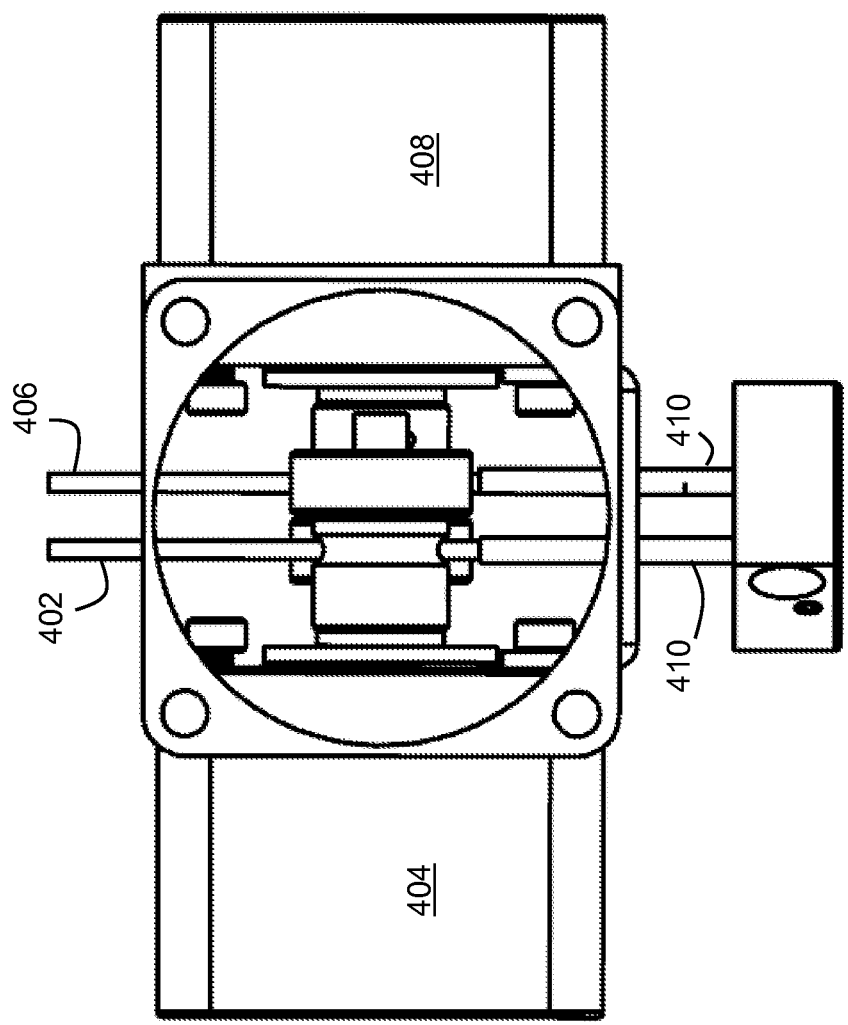
FIG. 4 is a side view of drive motors for a multi-extruder.

FIG. 4 is a side view of drive motors for a multi-extruder. As depicted the multi-extruder 400 has two overlapping axes in opposing, parallel alignment to form two channels for filament all as described above.

A first filament 402 may enter a first channel (not visible in the side perspective) where it is driven by a first motor 404, and a second filament 406 may enter a second channel (not visible) where it is independently driven by a second motor 408. Each filament 402, 406 may be driven into a receiving chamber 410 where the filament 402, 406 is, e.g., heated, liquefied, and pushed through a nozzle at a desired rate. It will be understood that processing paths downstream from the gears and bearings may combine into a single path for extrusion, or maintained as two separate paths for different materials, according to the types of build materials to be used, the build processes desired, and so forth.

The two filaments 402, 406 may be different build materials or the same type of build material. The two filaments 402, 406 may be different colors or the same color. The two filaments 402, 406 may be similar or different diameters. The two filaments 402, 406 may be formed of acrylonitrile butadiene styrene (ABS), high-density polyethylene ("HDPL"), polylactic acid, or any other suitable thermoplastic or other material.

It will be understood that while use of parallel offset axes is a convenient arrangement amenable to construction with many readily available components, strict parallelism is not required for operation of the devices described herein. While minor variations to perfect geometric parallelism are specifically within the scope of the term 'parallel' as used herein, non-parallel arrangements are also possible and are intended to fall within the scope of this disclosure. Non-parallelism may be readily accomplished, for example by beveling mating edges of gears and bearings where they form a channel, which beveling may achieve satisfactory operation over a wide range of non-parallel axis alignments.

While particular embodiments of the present invention have been shown and described, it will be apparent to those skilled in the art that various changes and modifications in form and details may be made therein without departing from the spirit and scope of the invention as defined by the following claims. For example, the principles of the invention may be usefully employed to accommodate three or more different build materials in a multi-extruder, which may be extruded concurrently or separately according to the physical arrangement of nozzles, heaters, and the like. The claims that follow are intended to include all such variations and modifications that might fall within their scope, and should be interpreted in the broadest sense allowable by law.

What is claimed is:

1. A device comprising:
a first motor having a first axis extending in a first direction;
a second motor having a second axis extending in a second direction opposite the first direction, the second axis parallel to and overlapping with the first axis;
a first gear rigidly coupled to the first axis, the first gear having a first concave, toothed portion around a first perimeter thereof;
a second gear rigidly coupled to the second axis at a first position axially offset from the first gear, the second gear having a second concave, toothed portion around a second perimeter thereof;

a first bearing rotatably coupled to the first axis at a second position axially aligned with the second gear of the second axis, thereby forming a channel between the first bearing and the second gear to receive and move a first filament by rotation of the second motor; and a second bearing rotatably coupled to the second axis at a third position axially aligned with the first gear of the first axis, thereby forming a second channel between the second bearing and the first gear to receive and move a second filament by rotation of the first motor.

2. The device of claim 1 wherein the first gear and the second gear are equally proportioned.

3. The device of claim 1 wherein the first motor and the second motor are equally proportioned.

4. The device of claim 1 wherein the first bearing and the second bearing are equally proportioned.

5. The device of claim 1 further comprising a controller coupled to the first motor and the second motor to control operation thereof.

6. The device of claim 5 wherein the controller further controls a build process using two filaments fed to the device.

7. The device of claim 6 wherein the two filaments are different build materials.

8. The device of claim 6 wherein the two filaments are different colors.

9. The device of claim 6 wherein at least one of the two filaments is formed of a material selected from a group consisting of acrylonitrile butadiene styrene, high-density polyethylene ("HDPL"), and polylactic acid.

10. The device of claim 6 further comprising one or more additional motors and gears configured to drive one or more additional build materials in an extrusion process.

11. A three-dimensional fabrication device comprising:

a multi-extruder having a pair of drive motors, each having an axis with a fixed gear and a free-wheeling bearing, the pair of drive motors arranged in an opposing, overlapping arrangement so that the fixed gear of one drive motor aligns with the free-wheeling bearing of the other drive motor to form two independently controllable filament drives;

an interior chamber to receive a build material from at least one of the two independently controllable filament drives;

a heating element that liquefies the build material;

a nozzle that extrudes the build material;

a build platform that receives an object formed of the build material that is extruded from the nozzle;

a positioning assembly that positions the build platform relative to the extruder during a build; and a controller coupled in a communicating relationship with the multi-extruder and the positioning assembly and programmed to control the multi-extruder and the positioning assembly in a build process.

12. The device of claim 11 further comprising a pair of nozzles that extrude a different build material from each of the two independently controllable filament drives.

13. The device of claim 11 further comprising a pair of heating elements that liquefy a different material from each of the two independently controllable filament drives.

14. The device of claim 11 further comprising a pair of interior chambers that receive a different build material from each of the two independently controllable filament drives.

15. The device of claim 11 wherein the controller is configured to operate the multi-extruder to provide two different build materials concurrently.

16. The device of claim 11 wherein the controller is configured to operate the multi-extruder to provide one build material at a time.

17. The device of claim 11 wherein the multi-extruder shares at least one of a single nozzle, a single heating element, and a single interior chamber for both of the independently controllable filament drives.

18. The device of claim 11 further comprising a plurality of additional extruders each coupled in a communicating relationship with the controller for use in a build process.

19. The device of claim 11 wherein the pair of drive motors have parallel axes.

20. The device of claim 11 wherein the pair of drive motors have non-parallel axes.

* * * * *